United States Patent
Rotholtz (10) Patent No.: US 7,711,725 B2
(45) Date of Patent: May 4, 2010

(54) SYSTEM AND METHOD FOR GENERATING REFERRAL FEES

(75) Inventor: Ben Aaron Rotholtz, Yarrow Point, WA (US)

(73) Assignee: RealNetworks, Inc., Seattle, WA (US)

( * ) Notice: Subject to any disclaimer, the term of this patent is extended or adjusted under 35 U.S.C. 154(b) by 84 days.

(21) Appl. No.: 11/619,042

(22) Filed: Jan. 2, 2007

(65) Prior Publication Data

US 2008/0046318 A1 Feb. 21, 2008

Related U.S. Application Data

(63) Continuation-in-part of application No. 11/506,456, filed on Aug. 18, 2006.

(51) Int. Cl.
*G06F 17/30* (2006.01)

(52) U.S. Cl. .................. 707/706; 707/707; 707/722

(58) Field of Classification Search ............ 707/3–9, 707/100–102, 104.1; 705/14
See application file for complete search history.

(56) References Cited

U.S. PATENT DOCUMENTS

| | | | | |
|---|---|---|---|---|
| 2003/0001880 A1* | 1/2003 | Holtz et al. | ................. | 345/716 |
| 2004/0193580 A1* | 9/2004 | Martin et al. | ................. | 707/3 |
| 2004/0193600 A1* | 9/2004 | Kaasten et al. | ................. | 707/7 |
| 2005/0160107 A1* | 7/2005 | Liang | ................. | 707/100 |
| 2006/0020591 A1* | 1/2006 | Kommers et al. | ................. | 707/3 |
| 2006/0026147 A1* | 2/2006 | Cone et al. | ................. | 707/3 |
| 2006/0064411 A1* | 3/2006 | Gross et al. | ................. | 707/3 |
| 2006/0136391 A1* | 6/2006 | Morris | ................. | 707/3 |
| 2006/0224729 A1* | 10/2006 | Rowe et al. | ................. | 709/224 |
| 2007/0027902 A1* | 2/2007 | Ponte | ................. | 707/102 |
| 2007/0207780 A1* | 9/2007 | McLean | ................. | 455/414.1 |
| 2007/0208746 A1* | 9/2007 | Koide et al. | ................. | 707/9 |
| 2007/0255754 A1* | 11/2007 | Gheel | ................. | 707/104.1 |
| 2008/0059455 A1* | 3/2008 | Canoy et al. | ................. | 707/5 |

OTHER PUBLICATIONS

Notice of Allowance, U.S. Appl. No. 11/506,456, filed Aug. 18, 2006, Rotholtz, Ben Aaron.

* cited by examiner

*Primary Examiner*—Don Wong
*Assistant Examiner*—Hanh B Thai
(74) *Attorney, Agent, or Firm*—Axios Law; Adam L. K. Philipp (57) ABSTRACT

A method, computer program product and computing device for offering complementary products/services includes monitoring one or more actions taken by a user while browsing a website. One or more search terms are assigned to at least one of the one or more actions taken by the user. One or more complementary terms are assigned that define one or more products/services that complement the one or more actions taken by the user. A query is executed on a datastore based on at least a portion of the one or more search terms and at least a portion of the one or more complementary terms to generate a result set.

30 Claims, 10 Drawing Sheets

SYSTEM AND METHOD FOR GENERATING REFERRAL FEES

RELATED APPLICATIONS

This application is a Continuation-in-Part of and claims the priority of the following application, which is herein incorporated by reference: U.S. Ser. No. 11/506,456, filed 18 Aug. 2006, and entitled SYSTEM AND METHOD FOR AUTOMATICALLY GENERATING A RESULT SET.

TECHNICAL FIELD

This disclosure relates to internet-based sales of products/services and, more particularly, to internet-based sales of complementary products/services.

BACKGROUND

When a user browses a website, the actions taken by the user may be indicative of the various likes and dislikes of the particular user. For example, if the browser of a website reviews material concerning a particular type of music, these actions may be indicative of the user being a fan of that type of music. Further, if the browser of a website reviews material concerning a particular political party, these actions may be indicative of the user being a member of/interested in that political party. Accordingly, by monitoring the actions taken by a browser of a website, the particular tastes of the user may be discernible.

Additionally, once the particular likes and dislikes of the user are determined, the user may be interested in purchasing complementary products/services if the user was made aware of the availability of such complementary products/services.

SUMMARY OF DISCLOSURE

In a first implementation, a method for offering complementary products/services includes monitoring one or more actions taken by a user while browsing a website. One or more search terms are assigned to at least one of the one or more actions taken by the user. One or more complementary terms are assigned that define one or more products/services that complement the one or more actions taken by the user. A query is executed on a datastore based on at least a portion of the one or more search terms and at least a portion of the one or more complementary terms to generate a result set.

One or more of the following features may be included. The result set may be presented to the user of the website. The one or more actions taken by the user may be chosen from the group consisting of: rendering a media file; uploading a data file; downloading a data file; posting an article; reviewing an article; posting a message; reviewing a message; executing a query; purchasing a product; offering a product for sale; purchasing a service; and offering a service for sale.

The one or more products/services that complement the one or more actions taken by the user may be chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

The sale of the one or more products/services that complement the one or more actions taken by the user may be facilitated. A fee may be charged for facilitating the sale of the one or more products/services that complement the one or more actions taken by the user. Facilitating the sale of the one or more products/services that complement the one or more actions taken by the user may include providing a link to an ecommerce website that offers for sale the one or more products/services that complement the one or more actions taken by the user. The datastore may include one or more of: a database servable by a computing device; and a system memory accessible by a computing device.

In another implementation, a computer program product resides on a computer readable medium and has a plurality of instructions stored on it. When executed by a processor, the instructions cause the processor to perform operations that include monitoring one or more actions taken by a user while browsing a website. One or more search terms are assigned to at least one of the one or more actions taken by the user. One or more complementary terms are assigned that define one or more products/services that complement the one or more actions taken by the user. A query is executed on a datastore based on at least a portion of the one or more search terms and at least a portion of the one or more complementary terms to generate a result set.

One or more of the following features may be included. The result set may be presented to the user of the website. The one or more actions taken by the user may be chosen from the group consisting of: rendering a media file; uploading a data file; downloading a data file; posting an article; reviewing an article; posting a message; reviewing a message; executing a query; purchasing a product; offering a product for sale; purchasing a service; and offering a service for sale.

The one or more products/services that complement the one or more actions taken by the user may be chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

The sale of the one or more products/services that complement the one or more actions taken by the user may be facilitated. A fee may be charged for facilitating the sale of the one or more products/services that complement the one or more actions taken by the user. Facilitating the sale of the one or more products/services that complement the one or more actions taken by the user may include providing a link to an ecommerce website that offers for sale the one or more products/services that complement the one or more actions taken by the user. The datastore may include one or more of: a database servable by a computing device; and a system memory accessible by a computing device.

In another implementation, a computing device is configured to perform operations that include monitoring one or more actions taken by a user while browsing a website. One or more search terms are assigned to at least one of the one or more actions taken by the user. One or more complementary terms are assigned that define one or more products/services that complement the one or more actions taken by the user. A query is executed on a datastore based on at least a portion of the one or more search terms and at least a portion of the one or more complementary terms to generate a result set.

One or more of the following features may be included. The result set may be presented to the user of the website. The one or more actions taken by the user may be chosen from the group consisting of: rendering a media file; uploading a data file; downloading a data file; posting an article; reviewing an article; posting a message; reviewing a message; executing a query; purchasing a product; offering a product for sale; purchasing a service; and offering a service for sale.

The one or more products/services that complement the one or more actions taken by the user may be chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

The sale of the one or more products/services that complement the one or more actions taken by the user may be facilitated. A fee may be charged for facilitating the sale of the one or more products/services that complement the one or more actions taken by the user. Facilitating the sale of the one or more products/services that complement the one or more actions taken by the user may include providing a link to an ecommerce website that offers for sale the one or more products/services that complement the one or more actions taken by the user. The datastore may include one or more of: a database servable by a computing device; and a system memory accessible by a computing device.

In another implementation, a method for offering complementary products/services includes monitoring one or more actions taken by a user while browsing a website. One or more search terms are assigned to at least one of the one or more actions taken by the user. A query string is generated based on at least a portion of the one or more search terms, and a query is executed on a third party datastore based on the query string to generate a result set.

One or more of the following features may be included. The sale of the one or more products/services that complement the one or more actions taken by the user may be facilitated. A fee may be charged for facilitating the sale of the one or more products/services that complement the one or more actions taken by the user.

In another implementation, a computer program product resides on a computer readable medium and has a plurality of instructions stored on it. When executed by a processor, the instructions cause the processor to perform operations that include monitoring one or more actions taken by a user while browsing a website. One or more search terms are assigned to at least one of the one or more actions taken by the user. A query string is generated based on at least a portion of the one or more search terms, and a query is executed on a third party datastore based on the query string to generate a result set.

One or more of the following features may be included. The sale of the one or more products/services that complement the one or more actions taken by the user may be facilitated. A fee may be charged for facilitating the sale of the one or more products/services that complement the one or more actions taken by the user.

In another implementation, a computing device is configured to perform operations that include monitoring one or more actions taken by a user while browsing a website. One or more search terms are assigned to at least one of the one or more actions taken by the user. A query string is generated based on at least a portion of the one or more search terms, and a query is executed on a third party datastore based on the query string to generate a result set.

One or more of the following features may be included. The sale of the one or more products/services that complement the one or more actions taken by the user may be facilitated. A fee may be charged for facilitating the sale of the one or more products/services that complement the one or more actions taken by the user.

The details of one or more implementations is set forth in the accompanying drawings and the description below. Other features and advantages will become apparent from the description, the drawings, and the claims.

DETAILED DESCRIPTION OF THE PREFERRED EMBODIMENTS

Figure 1:
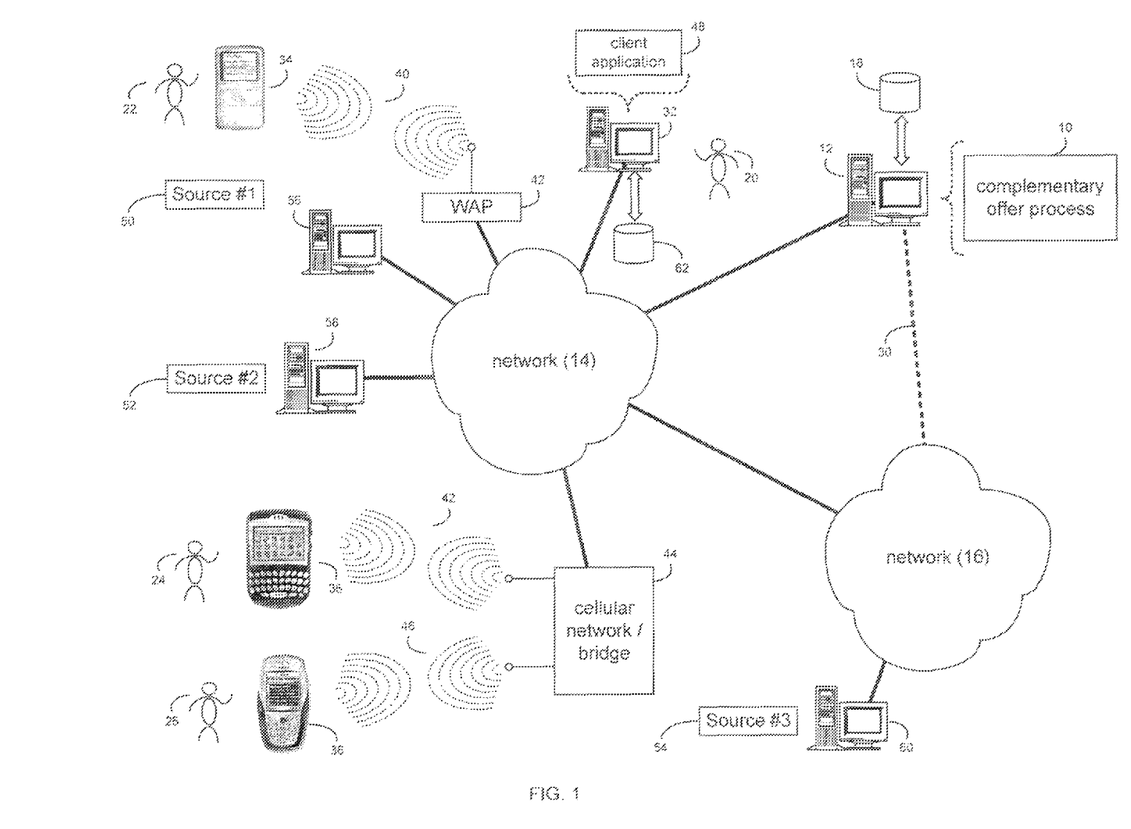
FIG. 1 is a diagrammatic view of a complementary offer process and a client application coupled to a distributed computing network.

System Overview:

Referring to FIG. 1, there is shown a complementary offer process 10 that may reside on and may be executed by data server 12. As will be discussed below in greater detail, complementary offer process 10 may monitor the actions taken by a user of a website and facilitate the sale of the one or more products/services that complement the actions taken by the user. Examples of such products/services that complement the actions taken by the user may include, but are not limited to: concert tickets; clothing; memorabilia; compact discs; digital video discs; audio tapes; video tapes; books; magazines, photographs; autographs; posters; airline tickets; train tickets; ground transportation; consumer products; consumer services; business products; and business services. Examples of data server 12 may include, but are not limited to, a personal computer, a mini computer, or mainframe computer, for example.

Complementary offer process 10 may be a server application that resides on and is executed by data server 12, which may be connected to network 14 (e.g., the Internet). Data server 12 may be a web server (or series of servers) running a network operating system, examples of which may include but are not limited to: Microsoft Windows 2003 Server™; Novell Netware™; or Redhat Linux™, for example.

Data server 12 may also execute a web server application, examples of which may include but are not limited to: Microsoft IIS™, Novell Webserver™, or Apache Webserver™, that allows for HTTP (i.e., HyperText Transfer Protocol) access to data server 12 via network 14. Network 14 may be connected to one or more secondary networks (e.g., network 16), examples of which may include but are not limited to: a local area network; a wide area network; or an intranet, for example.

The instruction sets and subroutines of complementary offer process 10, which may be stored on a storage device 18 coupled to data server 12, may be executed by one or more processors (not shown) and one or more memory architectures (not shown) incorporated into data server 12. Storage device 18 may include but is not limited to: a hard disk drive; a tape drive; an optical drive; a RAID array; a random access memory (RAM); or a read-only memory (ROM).

Users 20, 22, 24, 26 may access complementary offer process 10 directly through network 14 or through secondary network 16. Further, data server 12 (i.e., the computer that executes complementary offer process 10) may be connected to network 14 through secondary network 16, as illustrated with phantom link line 30.

Users 20, 22, 24, 26 may access complementary offer process 10 through various client devices, examples of which may include but are not limited to client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), and a portable gaming device (e.g., a Sony Playstation Portable™, not shown), for example.

The various client devices may be directly or indirectly coupled to network 14 (or network 16). For example, client computer 32 is shown directly coupled to network 14 via a hardwired network connection. Further, personal media device 34 is shown wirelessly coupled to network 14 via wireless communication channel 40 established between personal media device 34 and wireless access point (i.e., WAP) 42, which is shown directly coupled to network 14. WAP 42 may be, for example, an IEEE 802.11a, 802.11b, 802.11g, Wi-Fi, and/or Bluetooth device that is capable of establishing wireless communication channel 40 between personal media device 34 and WAP 42.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Personal digital assistant 36 is shown wirelessly coupled to network 14 via wireless communication channel 42 established between personal digital assistant 36 and cellular network/bridge 44, which is shown directly coupled to network 14. Further, cellular telephone 38 is shown wirelessly coupled to network 14 via wireless communication channel 46 established between cellular telephone 38 and cellular network/bridge 44.

Client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), and a portable gaming device (e.g., a Sony Playstation™ Portable, not shown), may each execute a client application (e.g., client application 48) that interfaces with complementary offer process 10 and facilitates the bidirectional transfer of digital content between data sources (e.g., sources 50, 52, 54) and users (e.g., users 20, 22, 24, 26). Examples of data sources 50, 52, 54 include websites that are hosted by e.g., web servers 56, 58, 60, respectively.

Client application 48 may be a web browser (e.g., Microsoft Internet Explorer™ and Netscape Navigator™, for example), a stand alone application, or an applet running within another program (e.g., Microsoft Internet Explorer™ and Netscape Navigator™, for example). Client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), and a portable gaming device (e.g., a Sony Playstation™ Portable, not shown), may each execute an operating system, examples of which may include but are not limited to Microsoft Windows™, Microsoft Windows CE™, Redhat Linux™, or a custom operating system.

The instruction sets and subroutines of client application 48, which may be stored on a storage device (e.g., storage device 62) coupled to e.g., client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), or a portable gaming device (e.g., a Sony Playstation™ Portable, not shown), are executed by one or more processors (not shown) and one or more memory architectures (not shown) incorporated into e.g., client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), or a portable gaming device (e.g., a Sony Playstation™ Portable, not shown). Storage device 62 may include but is not limited to a hard disk drive, a tape drive, an optical drive, a RAID array, a random access memory (RAM), or a read-only memory (ROM).

Using client application 48, users 20, 22, 24, 26 may visit one or more websites (e.g., 50, 52, 54) and perform various actions on the website(s). Examples of the various types of websites may include, but are not limited to: news websites (e.g., www.cnn.com, www.foxnews.com); weblog websites (e.g., www.blogspot.com, www.xanga.com); auction websites (e.g., www.ebay.com, www.bidz.com); dating/matchmaking websites (www.eharmony.com, www.match.com); special interest websites (e.g., www.ichef.com, www.imdb.com); search engine/internet portal websites (e.g., www.google.com, www.yahoo.com); ecommerce websites (e.g., www.amazon.com, www.overstock.com); and social networking websites (www.myspace.com, www.classmates.com, www.reunion.com, www.friendster.com).

Examples of the types of actions taken by a user may include, but are not limited to: rendering a media file; uploading a data file; downloading a data file; posting an article; reviewing an article; posting a message; reviewing a message; executing a query; purchasing a product; offering a product for sale; purchasing a service; and offering a service for sale.

Figure 2:
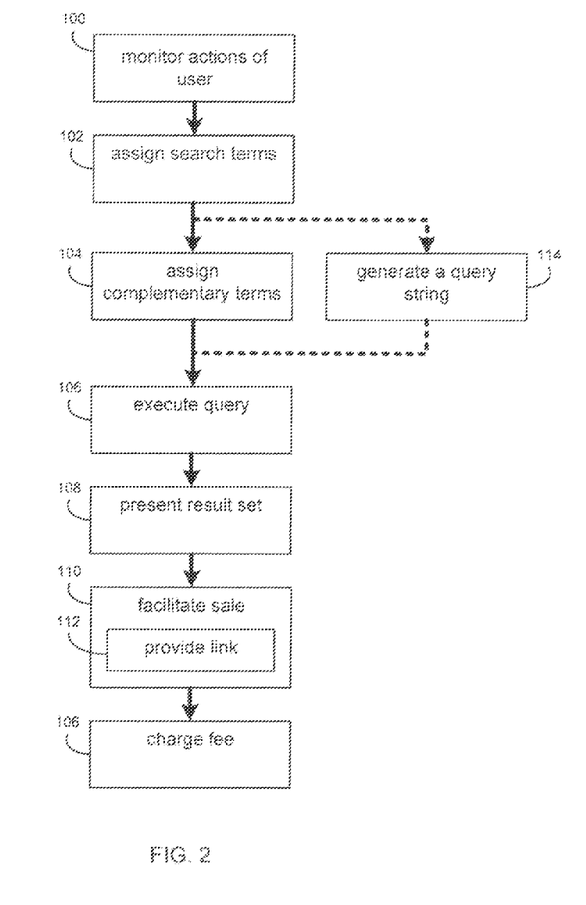
FIG. 2 is a flowchart of a process executed by the complementary offer process and/or the client application of FIG. 1.

The Complementary Offer Process:

Referring also to FIG. 2, when a user (e.g., user 20) browses a website, complementary offer process 10 may monitor 100 one or more actions taken by the user. For example and referring also to FIG. 3, assume that user 20 uses client application 48 to visit a social networking website (e.g., www.myspace.com). Client application 48 may render a webpage 150 that is presented to user 20.

Figure 3:
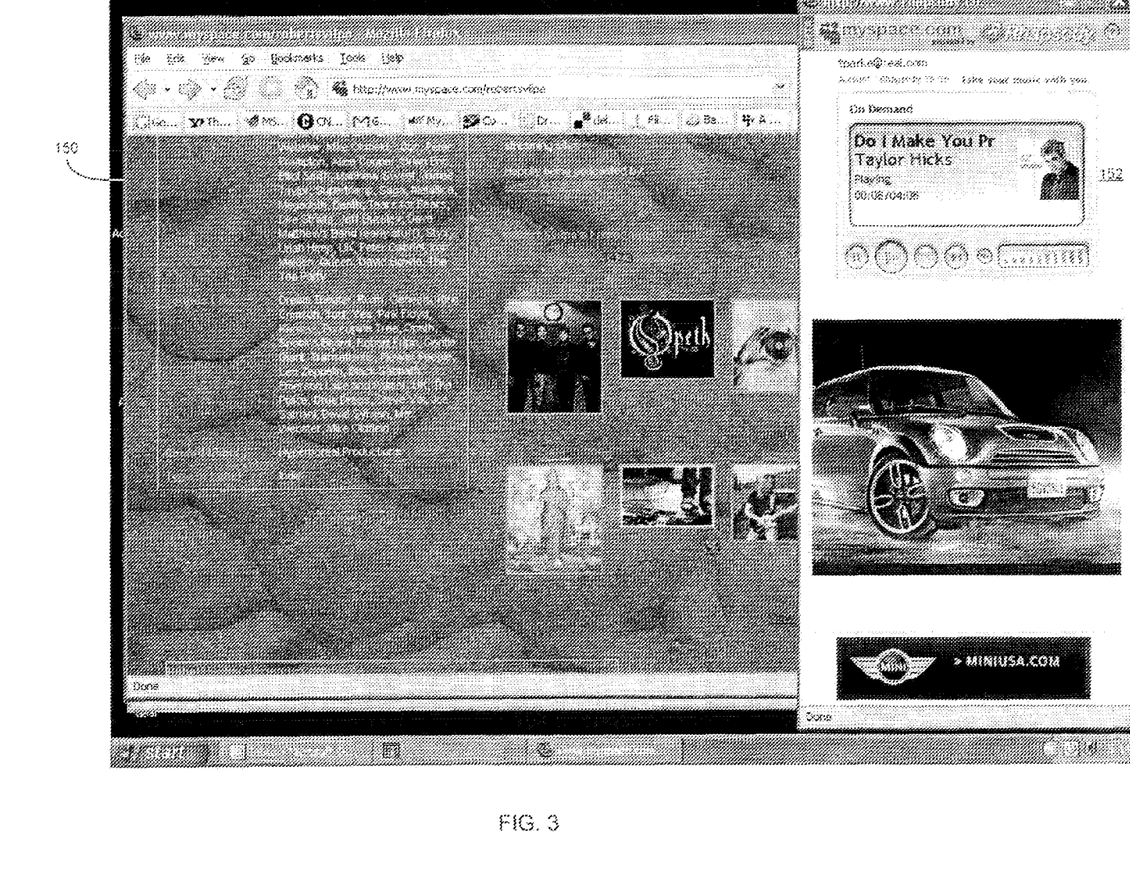
FIG. 3 is a diagrammatic view of a screen rendered by the complementary offer process and/or client application of FIG. 1.

While browsing e.g., the social networking website, user 20 may take one or more actions that (as discussed above) may be monitored 100 by complementary offer process 10. For example, user 20 may launch an application (e.g., Rhapsody™ by RealNetworks, Inc. and Windows MediaPlayer™ by The Microsoft Corporation) 152 that e.g., renders media data files. For example, application 152 may render audio files, thus allowing user 20 to e.g., listen to music while browsing the website. Additionally/alternatively, application 152 may render video files, thus allowing user 20 to e.g., watch video clips while browsing the website.

Application 150 may be a stand alone application (e.g., Rhapsody™ by RealNetworks, Inc. and Windows MediaPlayer™ by The Microsoft Corporation), or an applet running within another program (e.g., client application 48, for example).

While application 150 is shown to be a media rendering application (e.g., Rhapsody™ by RealNetworks, Inc.), this is for illustrative purposes only and other types of applications are considered to be within the scope of this disclosure. For example, application 150 may be a searching application/applet that allows user 20 to search the content of the website that the user is browsing. For example, if the website is an auction/ecommerce website, application 150 may be a searching application that allows user 20 to search for various products available within the auction/ecommerce website.

Monitoring 100 the actions taken by the user may include, but is not limited to: monitoring the music listened to by user 20 while browsing the website; monitoring the videos watched by user 20 while browsing the website; monitoring the search strings/queries entered by user 20 while browsing the website; monitoring the articles reviewed by user 20 while browsing the website; monitoring the articles posted by user 20 while browsing the website; monitoring the files uploaded by user 20 to the website; monitoring the files downloaded by user 20 from the website; monitoring email/messages received by the user while browsing the website; monitoring email/messages posted by user 20 to the website; monitoring the products researched by user 20 while browsing the website; monitoring the products purchased by user 20 while browsing the website; monitoring the services researched by user 20 while browsing the website; and monitoring the services purchased by user 20 while browsing the website.

Continuing with the above-stated example, once user 20 accesses e.g., the social networking website and launches application 152 to e.g., listen to music, complementary offer process 10 may e.g., monitor 100 the music selected and rendered by the user. Complementary offer process 10 may assign 102 one or more search terms to each of the actions taken by user 20, thus defining one or more initial search terms. The manner in which complementary offer process 100 assigns 102 search terms to the actions taken by user 20 may vary depending on the type of action taken by the user. For example, if the action taken by the user is the rendering of a media file, the search terms assigned 102 to that action may be extracted from and/or based upon the metadata associated with the media file. For example, if user 20 (through application 152) renders a media file for the track "Do I Make You Proud" by Artist "Taylor Hicks", complementary offer process 10 may assign 102 one or more of the terms "Do", "I", "Make", "You", "Proud", "Taylor", "Hicks" to the action (i.e., the rendering of the track "Do I Make You Proud" by Artist "Taylor Hicks") taken by user 20, thus defining one or more search terms.

Complementary offer process 10 may assign 104 one or more complementary terms that define one or more products/services that complement the one or more actions taken by the user. The manner in which complementary offer process 100 assigns 104 the complementary terms may vary depending on the type of action taken by the user. Continuing with the above-stated example, as user 20 (through application 152) is rendering a media file for the track "Do I Make You Proud" by Artist "Taylor Hicks", user 20 may be interested in "Taylor Hicks" related products/services. Examples of such "Taylor Hicks" related products/services may include, but are not limited to, concerts tickets, albums, compact discs, digital video discs, posters, clothing, memorabilia, and consumer goods, for example. Therefore, complementary offer process 10 may assign 104 complementary terms "tickets", "compact discs", "clothing", "memorabilia", "tour", and "official webpage".

Complementary offer process 10 may execute 106 a query on a datastore based on at least a portion of the one or more search terms and at least a portion of the one or more complementary terms to generate a result set. Examples of the datastore searched may include a database (not shown) servable by e.g., data server 12 and stored on storage device 18. Additionally/alternatively, the datastore (not shown) may be served by a third party (e.g., merchant) server (not shown). Additionally/alternatively, the datastore may include a system memory (not shown) accessible by data server 12. Continuing with the above-stated example, complementary offer process 10 may execute 106 a query based on the terms "Taylor" and "Hicks" (chosen from the search terms) and "tickets", "compact discs", "memorabilia", and "clothing" (chosen from the complementary terms).

Continuing with the above-stated example, after execution 106 of the query and generation of the result set, complementary offer process 10 may present 108 the result set to the user (e.g., user 20) of the website. The content/type of the result set may very depending on complementary search terms assigned 104 by complementary offer process. As the complementary terms assigned 104 include "tickets", "compact discs", "memorabilia" and "clothing", the result set may include links that facilitate 110 the sale of Taylor Hicks related "tickets", "compact discs", "memorabilia" and "clothing".

Figure 4:
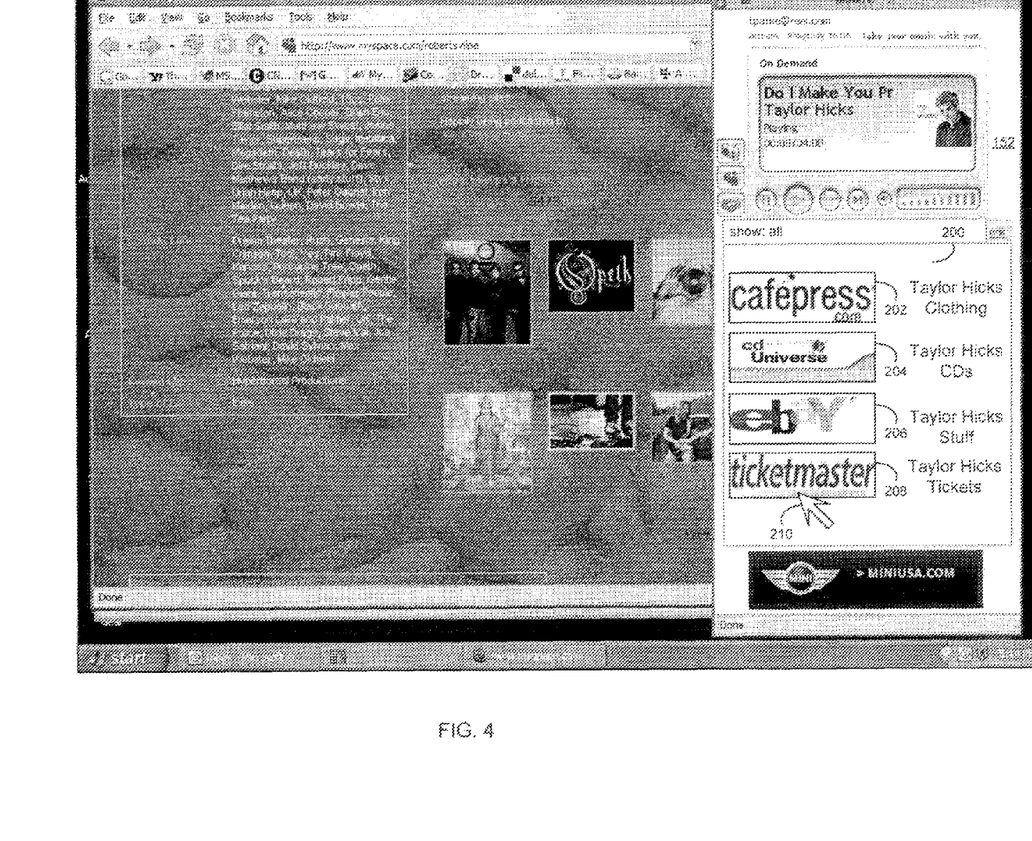
FIG. 4 is a diagrammatic view of a screen rendered by the complementary offer process and/or client application of FIG. 1.

Referring also to FIG. 4 and continuing with the above-stated example in which user 20 is listening (using application 152) to the track "Do I Make You Proud" by Artist "Taylor Hicks" while browsing a social networking website, result set 200 may be generated by complementary offer process 10 and presented 108 to user 20. In this particular example, result set 200 is shown to include a plurality of icons 202, 204, 206, 208 that provide 112 links to various ecommerce websites. For example, icon 202 may provide 112 a link to www.cafepress.com (i.e., a merchandise ecommerce website); icon 204 may provide 112 a link to www.cduniverse.com (i.e., a compact disc ecommerce website), icon 206 may provide 112 a link to www.ebay.com (i.e., a auction ecommerce website), and icon 208 may provide 112 a link to www.ticketmaster.com (i.e., a ticket ecommerce website); each of which may be selectable via screen pointer 210 (which may be controllable via a mouse/pointing device, not shown).

Figure 5:
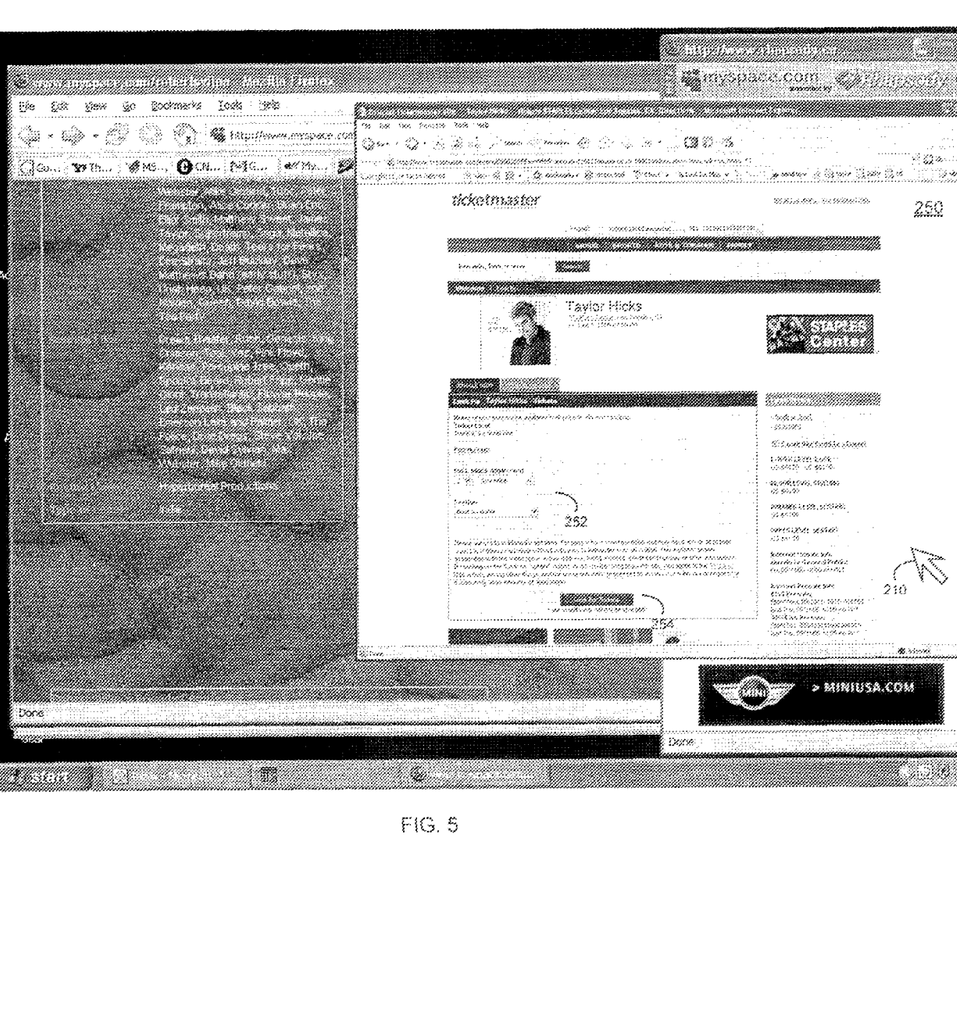
FIG. 5 is a diagrammatic view of a screen rendered by the complementary offer process and/or client application of FIG. 1.

Continuing with the above-stated example, assume that user 20 (i.e., a Taylor Hicks fan) wishes to buy some concert tickets to an upcoming Taylor Hicks concert in Los Angeles, Calif. User 20 may select (with screen pointer 210) icon 208, which provides 112 to link to a ticket ecommerce website (e.g., www.ticketmaster.com) 250, which may be rendered by complementary offer process 10 and may be navigable via screen pointer 250. In this particular example, this link provided 112 is:

http://www.ticketmaster.com/event/
   09003D2FE66695E9?artistid=
   726127&majorcatid=10001&minorcatid=3&tm_link=
   tm_home_f3

Figure 6:
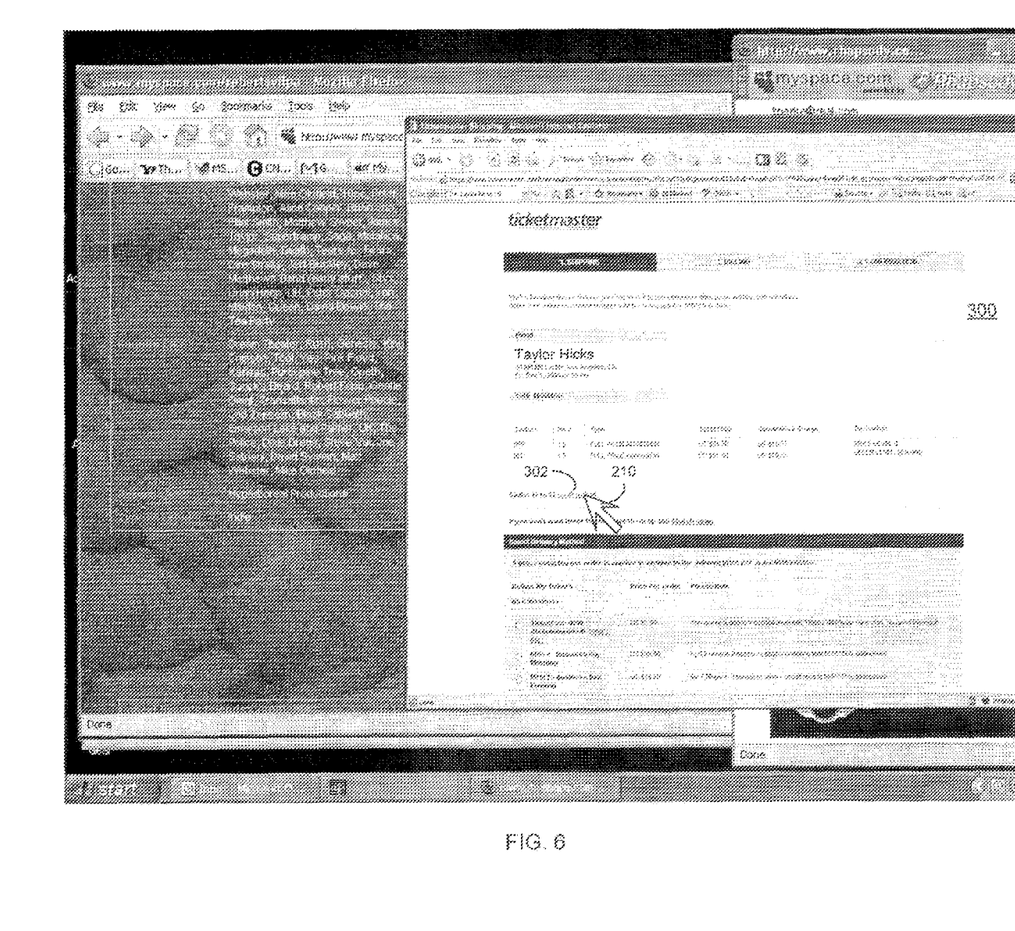
FIG. 6 is a diagrammatic view of a screen rendered by the complementary offer process and/or client application of FIG. 1.
Figure 7:
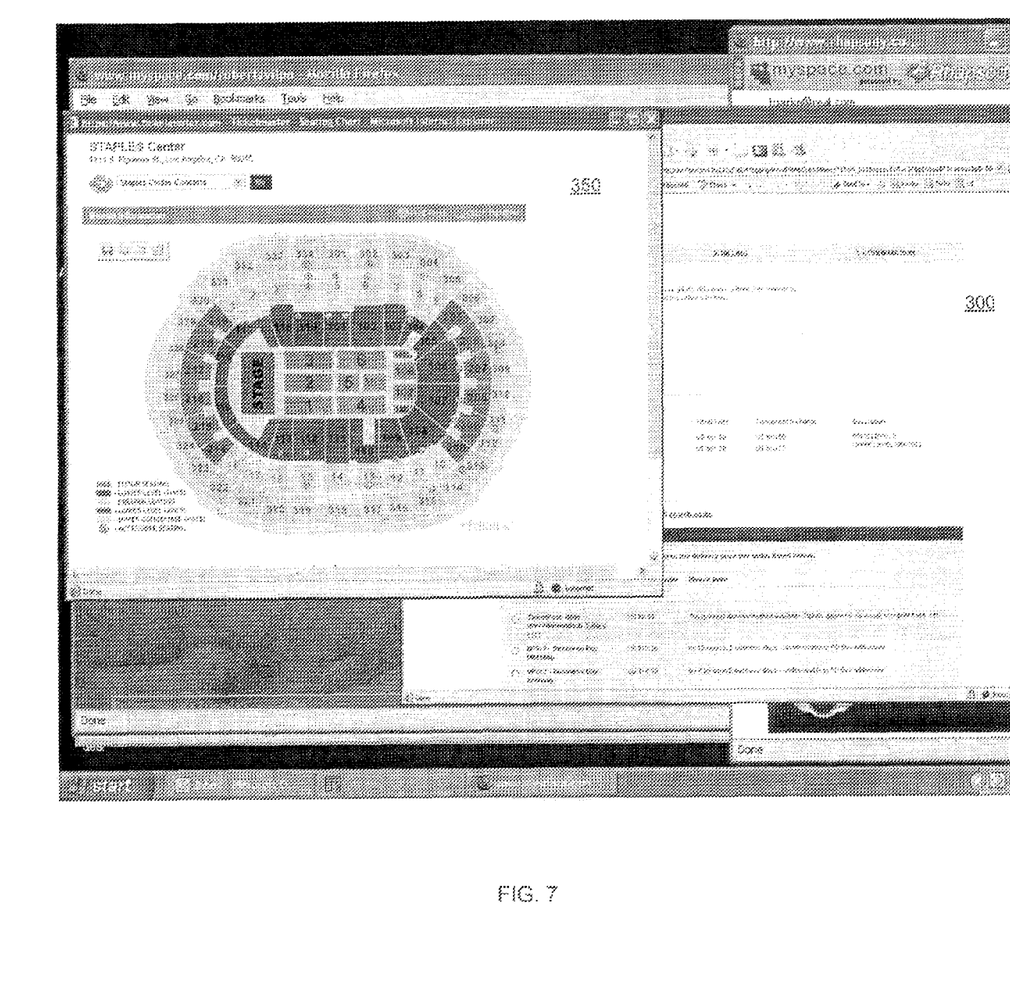
FIG. 7 is a diagrammatic view of a screen rendered by the complementary offer process and/or client application of FIG. 1.

In this particular example, user 20 may select the desired quantity and type of seats (via dropdown menus 252) and then select the "Look For Tickets" button 254 (using e.g., screen pointer 210). Referring also to FIG. 6, once e.g., button 254 is selected by user 20, complementary offer process 10 may render ticket purchase webpage 300 that allows user 20 to purchase Taylor Hicks tickets. User 20 may select (via screen pointer 20) seating chart link 302, which may result in the rendering of a seating chart 350 (FIG. 7) for the appropriate venue (e.g., The Staples Center).

Assuming that user 20 completes the sale of the tickets, complementary offer process 10 may charge a referral fee to the appropriate merchant. For example, assume that user 20 purchases a pair of Taylor Hicks tickets having a face value of $51.50 each, complementary offer process 10 may charge 114 the merchant (e.g., Ticket Master) a 1.00% referral fee (i.e., $1.03) for facilitating 110 the sale of the tickets.

When providing 112 the link to the ticket ecommerce website, a referring party identifier may be embedded within the link to allow for accurate charging 114 of referral fees. For example, the link provide may be as follows:
   http://www.ticketmaster.com/event/
   09003D2FE66695E9?artistid=726127&majorcatid=
   10001&minorcatid=3&tm_link=tm_home_
   f3&referrer=9160307

In the above-listed link, the referrer=9160307 portion of the link may identify the referring party (e.g., RealNetworks, Inc) and enable payment of the referral fee from the merchant (e.g., Ticket Master) to the referring party (e.g., RealNetworks, Inc.).

Continuing with the above-stated example, assume that user 20 wishes to buy some Taylor Hick memorabilia in preparation of the upcoming concert. User 20 may select (with screen pointer 210) icon 206, which provides 112 a link to an auction ecommerce website (e.g., www.ebay.com) 400 (FIG. 8), which may be rendered by complementary offer process 10 and may be navigable via screen pointer 210. In this particular example, this link provided 112 is:
   http://search.ebay.com/taylor-
   hicks_W0QQfromZR8QQfsooZ2QQfsopZ3QQsbrsrt
   ZdQQsubmitsearchZSearch When providing 112 the link to the auction ecommerce website, a referring party identifier may be embedded within the link to allow for accurate charging 114 of referral fees. For example, the link provide may be as follows:
   http://search.ebay.com/taylor-
   hicks_W0QQfromZR8QQfsooZ2QQfsopZ3QQsbrsrt
   ZdQQsubmitsearchZSearch&referrer=9160307

Figure 8:
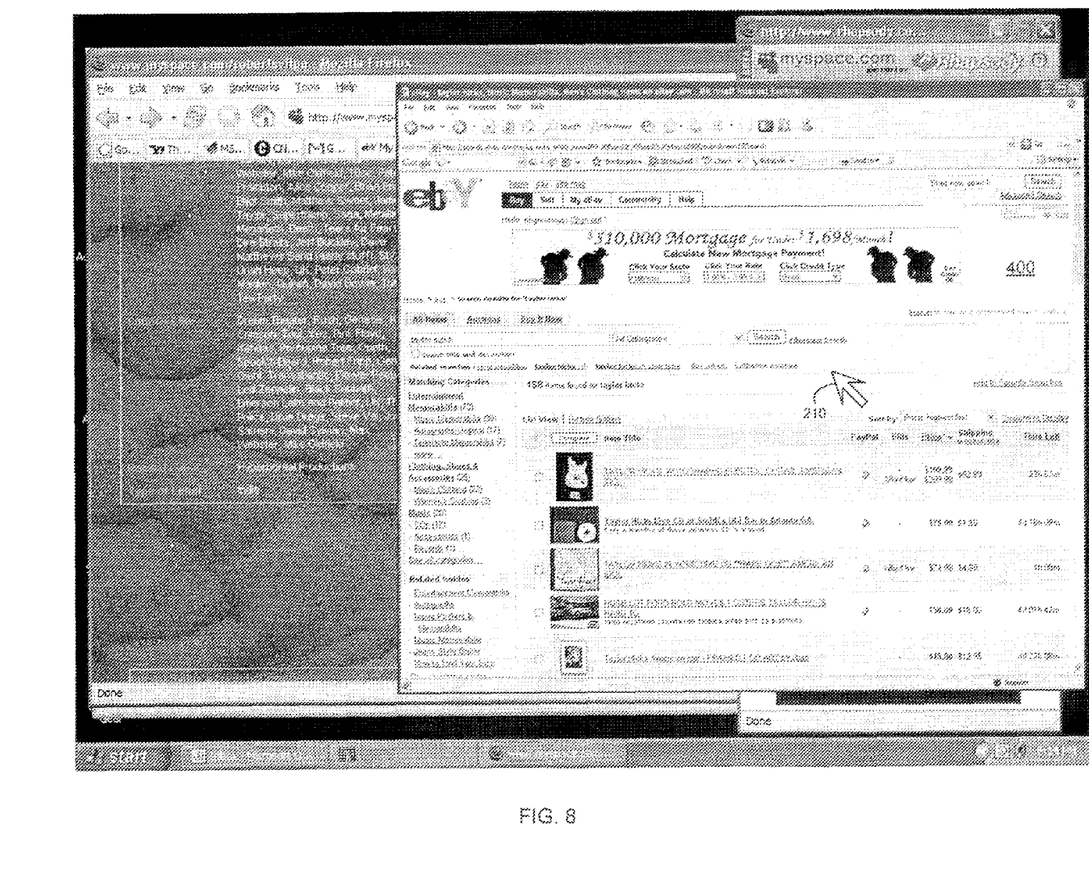
FIG. 8 is a diagrammatic view of a screen rendered by the complementary offer process and/or client application of FIG. 1.

In the above-listed link, the referrer=9160307 portion of the link may identify the referring party (e.g., RealNetworks, Inc) and enable payment of the referral fee from the merchant (e.g., EBay) to the referring party (e.g., RealNetworks, Inc.).

Continuing with the above-stated example, further assume that user 20 wishes to buy some Taylor Hick compact discs for listening to on the way to the concert. User 20 may select (with screen pointer 210) icon 204, which provides 112 a link to a compact disc ecommerce website (e.g., www.cduniverse.com) 450 (FIG. 9), which may be rendered by complementary offer process 10 and may be navigable via screen pointer 210. In this particular example, this link provided 112 is:
   http://www.cduniverse.com/search/xx/music/artist/
   Hicks,+Taylor/a/Taylor+Hicks.htm When providing 112 the link to the compact disc ecommerce website, a referring party identifier may be embedded within the link to allow for accurate charging 114 of referral fees. For example, the link provide may be as follows:
   http://www.cduniverse.com/search/xx/music/artist/
   Hicks,+Taylor/a/Taylor+Hicks.htm&referrer=9160307

Figure 9:
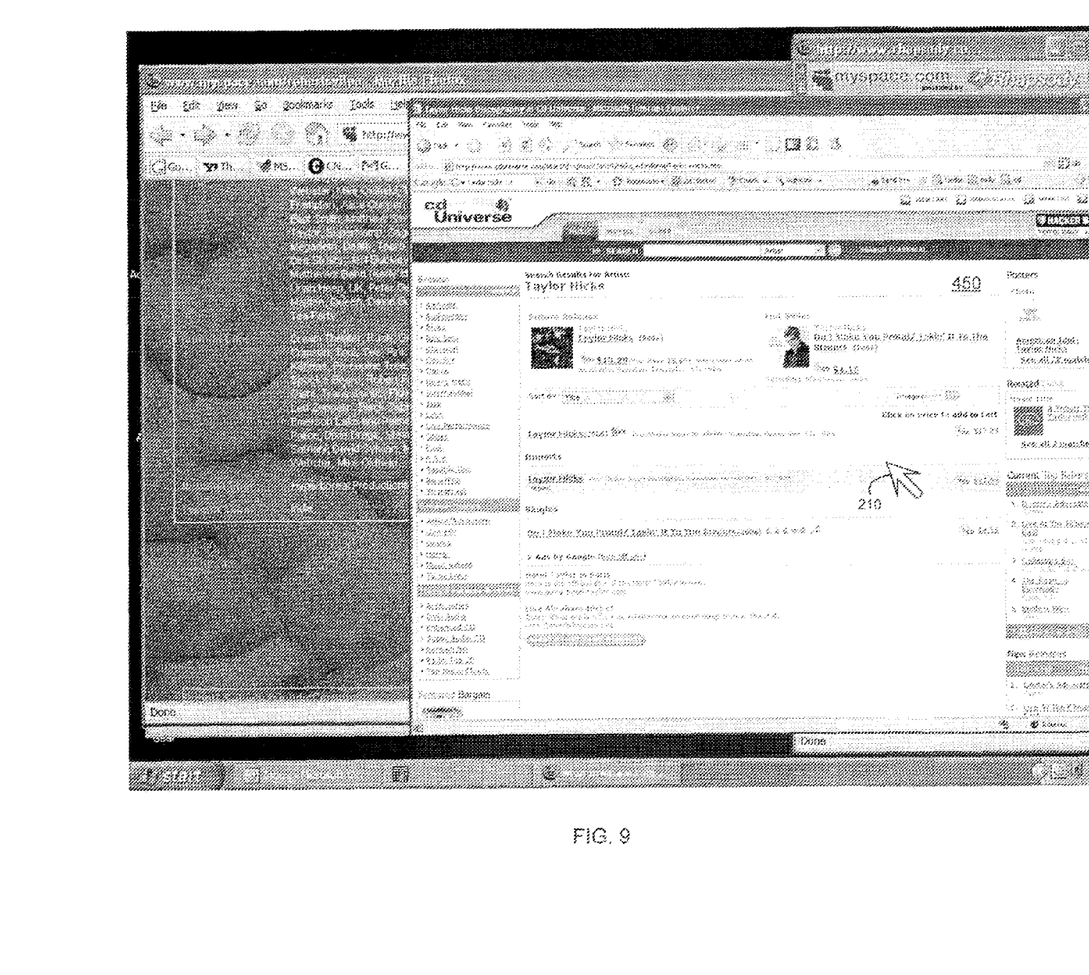
FIG. 9 is a diagrammatic view of a screen rendered by the complementary offer process and/or client application of FIG. 1.

In the above-listed link, the referrer=9160307 portion of the link may identify the referring party (e.g., RealNetworks, Inc) and enable payment of the referral fee from the merchant (e.g., CD Universe) to the referring party (e.g., RealNetworks, Inc.).

Continuing with the above-stated example, further assume that user 20 wishes to buy some Taylor Hick clothing for wearing to the concert. User 20 may select (with screen pointer 210) icon 202, which provides 112 a link to a merchandise ecommerce website (e.g., www.cafepress.com) 500 (FIG. 10), which may be rendered by complementary offer process 10 and may be navigable via screen pointer 210. In this particular example, this link provided 112 is:
   http://www.cafepress.com/buy/taylor%20hicks/-/cfpt2_/
   cfpt_/source_searchBox/copt_

Figure 10:
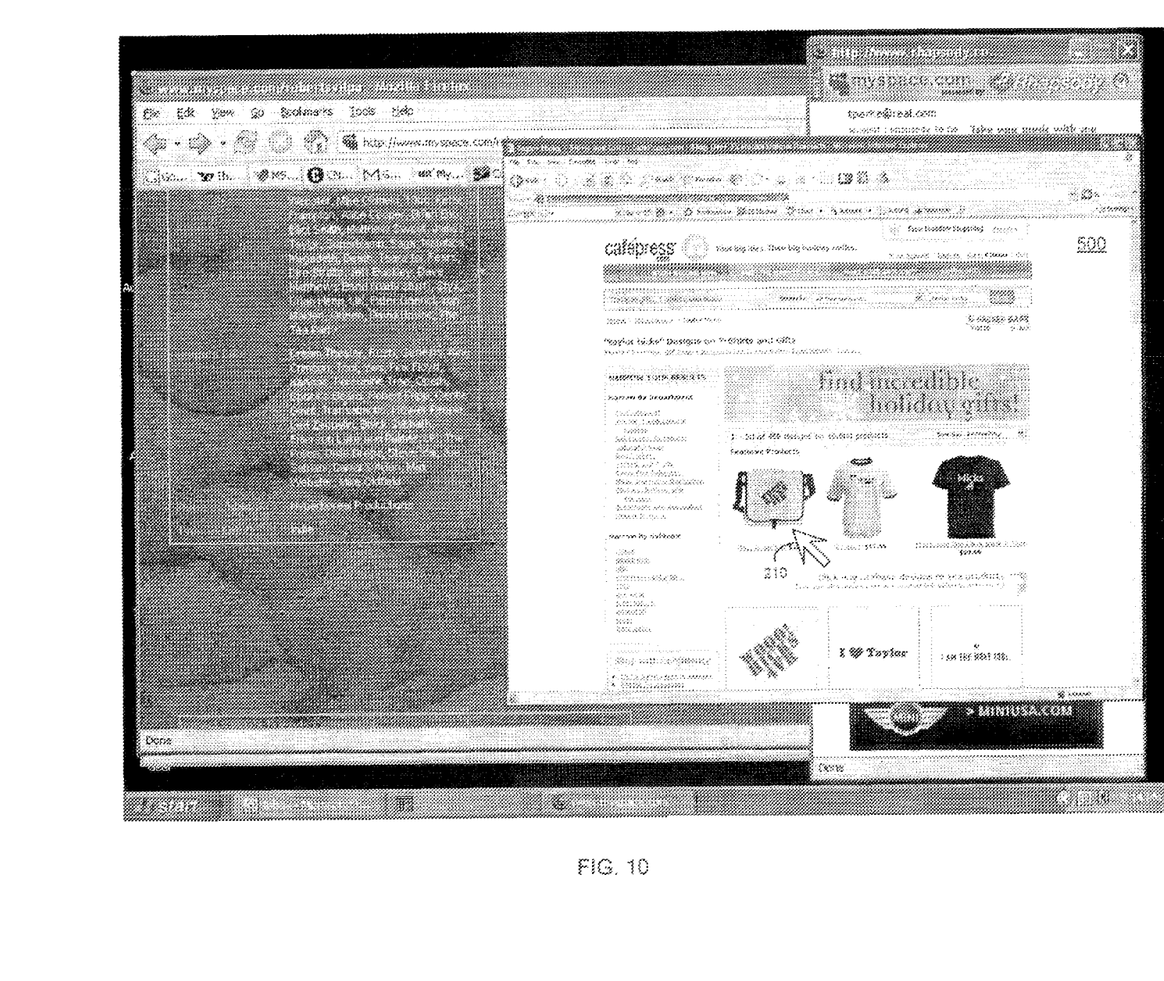
FIG. 10 is a diagrammatic view of a screen rendered by the complementary offer process and/or client application of FIG. 1.

When providing 112 the link to the merchandise ecommerce website, a referring party identifier may be embedded within the link to allow for accurate charging 114 of referral fees. For example, the link provide may be as follows:
   http://www.cafepress.com/buy/taylor%20hicks/-/cfpt2_/
   cfpt_/source_searchBox/copt_&referrer=9160307

In the above-listed link, the referrer=9160307 portion of the link may identify the referring party (e.g., RealNetworks, Inc) and enable payment of the referral fee from the merchant (e.g., Cafepress) to the referring party (e.g., RealNetworks, Inc.).

While complementary offer process is described above as executing a query that includes one or more complementary terms, other configurations are possible and are considered to be within the scope of this disclosure. For example and referring again to FIG. 4, complementary offer process may monitor 100 one or more actions taken by a user while browsing a website and assign 102 one or more search terms to at least one of the one or more actions taken by the user. However, instead of assigning 104 one or more complementary terms, complementary offer process 10 may generate 114 a query string for execution on a third party data store. For example and as discussed above, instead of adding the complementary term "tickets" and searching the internet for Taylor Hicks tickets, complementary offer process 10 may generate 114 a query string (which is based on at least a portion of the search terms) for execution 106 on a specific third-party website. For example, if you want to search for tickets, complementary offer process 10 may generate 114 the query string "Taylor Hicks", which may be provided to www.ticketmaster.com for execution 106 on the www.ticketmaster.com website. This, in turn, may result in the generation of a result set that is presented 108 to user 20 and defines available Taylor Hicks tickets.

Alternatively/additionally, if the user wanted to purchase Taylor Hicks clothing, instead of adding the complementary term "clothing" and searching the internet for Taylor Hicks clothing, complementary offer process 10 may generate the query string "Taylor Hicks", which may be provided to www-.cafepress.com for execution 106 on the www.cafepress.com website. This, in turn, may result in the generation of a result set that is presented 108 to user 20 and defines available Taylor Hicks clothing.

Alternatively/additionally, if the user wanted to purchase Taylor Hicks memorabilia, instead of adding the complementary term "memorabilia" and searching the internet for Taylor Hicks memorabilia, complementary offer process 10 may generate the query string "Taylor Hicks", which may be provided to www.ebay.com for execution 106 on the www.ebay.com website. This, in turn, may result in the generation of a result set that is presented 108 to user 20 and defines available Taylor Hicks memorabilia.

Alternatively/additionally, if the user wanted to purchase Taylor Hicks compact discs, instead of adding the complementary terms "compact discs" and searching the internet for Taylor Hicks compact discs, complementary offer process 10 may generate the query string "Taylor Hicks", which may be provided to www.cduniverse.com for execution 106 on the www.cduniverse.com website. This, in turn, may result in the generation of a result set that is presented 108 to user 20 and defines available Taylor Hicks compact discs.

While complementary offer process is described above as executing a query in response the user 20 rendering an audio track (e.g., "Do I Make You Proud" by "Taylor Hicks"), other configurations are possible and are considered to be within the scope of this disclosure. For example, assume that user 20 is logged into a community website that allows people to render video clips. Assuming that user 20 is watching video clips of "I Love Lucy", complementary offer process 10 may automatically generate a query for "I Love Lucy", thus resulting in the generation of a result set that identifies e.g., "I Love Lucy" memorabilia, digital video discs and books. Additionally, if user 20 is reading a webblog that praises a certain politician (e.g., John McCain), complementary offer process 10 may automatically generate a query for that politician (e.g., "John McCain"), thus resulting in the generation of a result set that identifies e.g., "John McCain" memorabilia and books. As another example, if user 20 is looking through online auto classified ads for a 1966 Pontiac GTO, complementary offer process 10 may automatically generate a query for "1966 Pontiac GTO), thus resulting in the generation of a result set that identifies "1966 Pontiac GTO" memorabilia, parts, books, and posters, for example.

A number of implementations have been described. Nevertheless, it will be understood that various modifications may be made. Accordingly, other implementations are within the scope of the following claims.

What is claimed is:

1. A computer implemented method for offering complementary products/services comprising:
   monitoring, via a computing device, one or more actions taken by a user while browsing a website;
   automatically assigning, via the computing device, one or more search terms to at least one of the one or more actions taken by the user based upon, at least in part, metadata associated with said one or more actions;
   assigning, via the computing device, one or more complementary terms that define one or more products/services that complement the one or more actions taken by the user;
   in response to at least one of the actions, executing a query on a datastore based on at least a portion of the one or more search terms and at least a portion of the one or more complementary terms to generate a result set; and
   displaying, via the computing device, the result set including a link to an ecommerce website that offers for sale the one or more products/services, the link embedded with a referring party identifier configured to identify a referring party to a merchant operating the ecommerce website for payment of a referral fee.

2. The computer implemented method of claim 1 further comprising: presenting the result set to the user of the website.

3. The computer implemented method of claim 1 wherein the one or more actions taken by the user are chosen from the group consisting of: rendering a media file; uploading a data file; downloading a data file; posting an article; reviewing an article; posting a message; reviewing a message; executing a query; purchasing a product; offering a product for sale; purchasing a service; and offering a service for sale.

4. The computer implemented method of claim 1 wherein the one or more products/services that complement the one or more actions taken by the user is chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

5. The computer implemented method of claim 1 further comprising: facilitating the sale of the one or more products/services that complement the one or more actions taken by the user.

6. The computer implemented method of claim 5 further comprising: charging a fee for facilitating the sale of the one or more products/services that complement the one or more actions taken by the user.

7. The computer implemented method of claim 1 wherein the datastore includes one or more of: a database servable by a computing device; and a system memory accessible by a computing device.

8. A computer program product residing on a computer readable medium having a plurality of instructions stored thereon that, when executed by a processor, cause the processor to perform operations comprising:
   monitoring one or more actions taken by a user while browsing a website;
   automatically assigning one or more search terms to at least one of the one or more actions taken by the user based upon, at least in part, metadata associated with said one or more actions;
   assigning one or more complementary terms that define one or more products/services that complement the one or more actions taken by the user;
   in response to at least one of the actions, executing a query on a datastore based on at least a portion of the one or more search terms and at least a portion of the one or more complementary terms to generate a result set; and
   displaying the result set including a link to an ecommerce website that offers for sale the one or more products/services, the link embedded with a referring party identifier configured to identify a referring party to a merchant operating the ecommerce website for payment of a referral fee.

9. The computer program product of claim 8 further comprising instructions for performing operations comprising: presenting the result set to the user of the website.

10. The computer program product of claim 8 wherein the one or more actions taken by the user are chosen from the group consisting of: rendering a media file; uploading a data file; downloading a data file; posting an article; reviewing an article; posting a message; reviewing a message; executing a query; purchasing a product; offering a product for sale; purchasing a service; and offering a service for sale.

11. The computer program product of claim 8 wherein the one or more products/services that complement the one or more actions taken by the user is chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

12. The computer program product of claim 8 further comprising instructions for performing operations comprising: facilitating the sale of the one or more products/services that complement the one or more actions taken by the user.

13. The computer program product of claim 12 further comprising instructions for performing operations comprising: charging a fee for facilitating the sale of the one or more products/services that complement the one or more actions taken by the user.

14. The computer program product of claim 8 wherein the datastore includes one or more of: a database servable by a computing device; and a system memory accessible by a computing device.

15. A computing device configured to perform operations comprising:
monitoring one or more actions taken by a user while browsing a website;
automatically assigning one or more search terms to at least one of the one or more actions taken by the user based upon, at least in part, metadata associated with said one or more actions;
assigning one or more complementary terms that define one or more products/services that complement the one or more actions taken by the user;
in response to at least one of the actions, executing a query on a datastore based on at least a portion of the one or more search terms and at least a portion of the one or more complementary terms to generate a result set; and
displaying the result set including a link to an ecommerce website that offers for sale the one or more products/services, the link embedded with a referring party identifier configured to identify a referring party to a merchant operating the ecommerce website for payment of a referral fee.

16. The computing device of claim 15, wherein the computing device is further configured to perform operations comprising: presenting the result set to the user of the website.

17. The computing device of claim 15 wherein the one or more actions taken by the user are chosen from the group consisting of: rendering a media file; uploading a data file; downloading a data file; posting an article; reviewing an article; posting a message; reviewing a message; executing a query; purchasing a product; offering a product for sale; purchasing a service; and offering a service for sale.

18. The computing device of claim 15 wherein the one or more products/services that complement the one or more actions taken by the user is chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

19. The computing device of claim 15, wherein the computing device is further configured to perform operations comprising: facilitating the sale of the one or more products/services that complement the one or more actions taken by the user.

20. The computing device of claim 19, wherein the computing device is further configured to perform operations comprising: charging a fee for facilitating the sale of the one or more products/services that complement the one or more actions taken by the user.

21. The computing device of claim 15 wherein the datastore includes one or more of: a database servable by a computing device; and a system memory accessible by a computing device.

22. A computer implemented method for offering complementary products/services comprising:
monitoring, via a computing device, one or more actions taken by a user while browsing a website;
automatically assigning, via the computing device, one or more search terms to at least one of the one or more actions taken by the user based upon, at least in part, metadata associated with said one or more actions;
generating, via the computing device, a query string based on at least a portion of the one or more search terms;
in response to at least one of the actions, executing a query on a third party datastore based on the query string to generate a result set; and
displaying, via the computing device, the result set including a link to an ecommerce website that offers for sale one or more products/services, the link embedded with a referring party identifier configured to identify a referring party to a merchant operating the ecommerce website for payment of a referral fee.

23. The computer implemented method of claim 22 further comprising: facilitating the sale of the one or more products/services that complement the one or more actions taken by the user.

24. The computer implemented method of claim 23 further comprising: charging a fee for facilitating the sale of the one or more products/services that complement the one or more actions taken by the user.

25. A computer program product residing on a computer readable medium having a plurality of instructions stored thereon that, when executed by a processor, cause the processor to perform operations comprising:
monitoring one or more actions taken by a user while browsing a website;
automatically assigning one or more search terms to at least one of the one or more actions taken by the user based upon, at least in part, metadata associated with said one or more actions;
generating a query string based on at least a portion of the one or more search terms;
in response to at least one of the actions, executing a query on a third party datastore based on the query string to generate a result set; and
displaying the result set including a link to an ecommerce website that offers for sale one or more products/services, the link embedded with a referring party identifier configured to identify a referring party to a merchant operating the ecommerce website for payment of a referral fee.

26. The computer program product of claim 25 further comprising instructions for performing operations comprising: facilitating the sale of the one or more products/services that complement the one or more actions taken by the user.

27. The computer program product of claim 26 further comprising instructions for performing operations comprising: charging a fee for facilitating the sale of the one or more products/services that complement the one or more actions taken by the user.

28. A computing device configured to perform operations comprising:
- monitoring one or more actions taken by a user while browsing a website;
- automatically assigning one or more search terms to at least one of the one or more actions taken by the user based upon, at least in part, metadata associated with said one or more actions;
- generating a query string based on at least a portion of the one or more search terms;
- in response to at least one of the actions, executing a query on a third party datastore based on the query string to generate a result set; and
- displaying the result set including a link to an ecommerce website that offers for sale the one or more products/services, the link embedded with a referring party identifier configured to identify a referring party to a merchant operating the ecommerce website for payment of a referral fee.

29. The computing device of claim 28, wherein the computing device is further configured to perform operations comprising: facilitating the sale of the one or more products/services that complement the one or more actions taken by the user.

30. The computing device of claim 29, wherein the computing device is further configured to perform operations comprising: charging a fee for facilitating the sale of the one or more products/services that complement the one or more actions taken by the user.

* * * * *